United States Patent
Fåhraeus

(12) 
(10) Patent No.: US 6,502,756 B1
(45) Date of Patent: Jan. 7, 2003

(54) RECORDING OF INFORMATION

(75) Inventor: Christer Fåhraeus, Lund (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 09/585,378

(22) Filed: May 26, 2000

Related U.S. Application Data

(60) Provisional application No. 60/138,400, filed on Jun. 9, 1999.

(30) Foreign Application Priority Data

May 28, 1999 (SE) .............................. 9901953
Apr. 5, 2000 (SE) .............................. 0001239

(51) Int. Cl.⁷ .............................................. G06K 19/06
(52) U.S. Cl. .................... 235/494; 235/380; 235/435
(58) Field of Search ................... 235/494, 380, 235/435

(56) References Cited

U.S. PATENT DOCUMENTS

| | | | |
|---|---|---|---|
| 4,445,028 A | 4/1984 | Huber | |
| 4,516,016 A | 5/1985 | Kodron | |
| 4,668,858 A | 5/1987 | Heuwieser et al. | |
| 5,003,472 A | 3/1991 | Perrill et al. | |
| 5,442,147 A | 8/1995 | Burns et al. | 178/18 |
| 5,661,506 A | 8/1997 | Lazzouni et al. | 345/179 |
| 5,852,434 A | 12/1998 | Sekendur | 345/179 |
| 5,854,474 A | 12/1998 | Goodwin, III | |
| 5,937,110 A | 8/1999 | Petrie et al. | 382/306 |
| 6,131,807 A * | 10/2000 | Fukuda et al. | 235/454 |
| 6,186,405 B1 * | 2/2001 | Yoshioka | 235/456 |
| 6,208,771 B1 | 3/2001 | Jared et al. | |
| 6,279,830 B1 * | 8/2001 | Ishibashi | 235/454 |
| 6,302,329 B1 * | 10/2001 | Iwai et al. | 235/456 |

FOREIGN PATENT DOCUMENTS

| | | |
|---|---|---|
| DE | 2312784 | 9/1974 |
| EP | 0 615 209 A2 | 9/1994 |
| GB | 2306669 A | 5/1997 |
| JP | 411238656 * | 8/1999 |
| WO | WO9504979 | 2/1995 |
| WO | 99/50787 | 10/1999 |
| WO | WO0025293 | 4/2000 |

OTHER PUBLICATIONS

Intelligent Paper, Marc Dymethman et al., Xerox Research Centre Europe, France *missing month and year.

* cited by examiner

*Primary Examiner*—Karl D. Frech
*Assistant Examiner*—Allyson Sanders

(57) ABSTRACT

A product which is intended to be used in connection with the recording of information has a surface on which there are a plurality of information alternatives which each have an associated code area. The surface is further provided with a two-dimensional position code which codes coordinates for a plurality of positions on the surface; which is unrelated to the information to be recorded and which enables recording of a desired information alternative by reading the position code for a position in the code area associated with the desired information alternative.

The product can advantageously be used in restaurants, when booking trips, making hotel reservations and the like.

A system for recording information, as well as a method and software for making the product are also described.

20 Claims, 5 Drawing Sheets

RECORDING OF INFORMATION

CROSS REFERENCE TO RELATED APPLICATION

This application claims the benefit of U.S. Provisional Application No. 60/138,400, filed Jun. 9, 1999.

FIELD OF THE INVENTION

The present invention relates to a product intended to be used in connection with the recording of information of the kind stated in the preamble to claim 1. The invention also relates to a system for recording information, a method for making a product for recording of information and an electronic storage medium for computers, on which software for the same purpose is stored.

BACKGROUND OF THE INVENTION

In restaurants there are often touch screens showing various dishes which a customer may order. The restaurant staff use these touch screens for entering orders which they take from the customer and for transmitting the orders to the kitchen where they are subsequently prepared. However, touch screens are relatively expensive and, consequently, restaurants usually only have a few of these screens. Furthermore, the touch screens are usually stationary, which means that staff members must stand in a particular location when entering the orders. Accordingly, in most cases customers cannot see which order is being entered and, consequently, they cannot check that the order they have placed has been entered correctly. Similar problems exist in, for example, the hotel industry and other industries where touch screens are used to take orders.

A solution to this problem, which is adapted to restaurants, is described in U.S. Pat. No. 4,516,016. The patent discloses a device intended to be placed on each table in a restaurant and to be used by customers for entering their order. The device comprises a menu and an optical reading pen. In the traditional way, the menu contains various food and drink alternatives, each alternative being associated with a barcode. The customer passes the optical reading pen across the barcode of the dish she wishes to order and the order is transmitted to the kitchen where staff check whether they can fill the order. If the order can be filled, a confirmation is transmitted to the customer in the form of an indicator light on the pen lighting up in green color. If the order cannot be filled, a red light comes on and the customer is obliged to chose a different dish. When the order has been filled, a bill is automatically printed for the customer. In the device according to U.S. Pat. No. 4,516,016 touch screens are thus not used and customers enter their orders themselves. However, it has certain other drawbacks. For example, special equipment is required for producing the barcodes. This equipment can be relatively expensive. Moreover, many restaurants do not have the use of this type of equipment, which makes it inconvenient for the restaurant staff to make temporary or permanent changes to the menus. Furthermore, problems arise if standardized barcodes do not exist for the dishes or beverages which are to be included in the menu.

WO 95/04979 discloses a system which makes it possible to produce, on the basis of a common check for a group of guests, a separate check for an individual guest in the group. On the common check, each partial order is identified in a traditional manner with a short description and a price. In addition, the partial order is provided with an ID number which indicates the number of the table in the restaurant and a serial number of the partial order. The ID number is also coded with a bar code. When a separate check is to be made, a bar code reader is used to read the bar codes which correspond to the partial orders for the guest at issue. The bar codes are transferred to a computer which has stored the partial orders and which, on the basis of table number and serial number, can identify the partial order and the price thereof.

Although in this case it is not necessary to be able to code the contents of the specific partial orders directly by means of bar codes but it is sufficient with table number and serial number, the system is just the same limited to precisely a table number and a serial number. If additional and/or other information is to be recorded, additional bar codes must be defined. If the information is to be rearranged and be printed using another layout, the system must also be changed so that the bar codes are printed in other positions.

Similar problems occur when various types of professionals wish to record information, for example, document what has been done, what is to be done, or what is available. One example is a dentist who while treating a patient writes down what he is doing by hand and later inputs the information to his computer. Another example are warehouse staff who take stock by walking around and writing down the items which are in stock. Yet another example are staff at motor vehicle inspection facilities who fill in a form with information about defects which must be corrected in a car which is being inspected. All these and other types of professionals thus are in need of recording information in a simple and flexible manner.

SUMMARY OF THE INVENTION

The object of the present invention is to provide an information recording system which is flexible at least to the same extent as or preferably to a greater extent than the above described bar code system.

This object is achieved wholly or partly according to the invention by a product, a system, a method, and an electronic storage medium as described and claimed herein.

According to a first aspect of the invention, it thus relates to a product which is intended for use in connection with the recording of information and which has a surface on which there are a plurality of information alternatives, each having an associated code area. The surface is provided with a two-dimensional position code which codes coordinates for a plurality of positions on the surface in said code areas, which is unrelated to the information which is to be recorded and which permits recording of a desired information alternative by reading the position code for a position in the code area associated with the desired information alternative.

The surface can be any surface to which a position code can be applied, for example by printing. The code is preferably applied to the surface from the outset, before adding the information alternatives. Alternatively, it can be applied simultaneously as the information alternatives or even after they have been applied.

A code area is associated with each information alternative. The code area can be adjacent to the information alternative or overlap it completely or partially. The information alternatives and their code areas should be arranged so that it is obvious to the user which pair of information alternative and code area belong together, enabling the user to record an information alternative by reading the code in the code area associated with the information alternative.

It should here be pointed out that information alternative should be interpreted in a wide sense. It need not be a matter of alternatives which exclude each other, but all forms of information units are included, of which the user may want to record one or more or all the information units.

By two-dimensional position code is further meant that the code codes coordinates in two dimensions for positions on the surface. Examples of advantageous position codes are stated in the specific description portion. Other two-dimensional position codes are also conceivable.

The position code is unrelated to the information that is to be recorded. Thus there is no fixed connection between code and information alternative. By this is meant that the code does not code the actual information, but merely positions on the surface, so that it is via the position on the surface that the connection to various information alternatives can be made. Obviously the same position code can be used for recording arbitrary information. No change of the code on the surface has to be made when changing the information alternatives, but the connection between position and information can be available in, for example, the memory of a computer where the connection is easy to change. In this way, a very flexible product is obtained.

A further advantage of the product according to the invention is that the two-dimensional position code renders it possible to make handwritten notes on the surface and to record these handwritten notes digitally by continuously reading the position code. The handwritten notes are thus represented as a number of positions. The characters or figures which these positions represent can further be interpreted by software, such as ICR software (ICR=Intelligent Character Recognition). If a device that is used to record information by reading the position code is provided with a pen point, it can thus be used to write ordinary handwritten notes on the surface of the product, to record these handwritten notes digitally, and to record information alternatives that are stated on the surface. This possibility is very useful since on many occasions where information is recorded there is a need to state further information, such as a number. The information that is being written also remains in physical form as a confirmation of the digitally recorded information.

This confirmation can also be obtained when recording merely information alternatives if the device has a pen point since in that case the pen point will make a mark in the position in which the user has read the position code.

If the position code covers the entire surface from which the information is to be recorded, in which case the position code thus codes positions with a certain resolution across the entire surface, a user can easily make products with arbitrary information alternatives and arbitrary layout, which products allow recording of the information alternatives by reading the position code. Various types of professionals can thus produce different forms with position code and with different information alternatives which can easily be recorded by reading the position code.

A user can more easily use a product according to the invention compared with a corresponding bar code product since it is sufficient to read the position code for a single position within the code area of an information alternative in order to record the associated information alternative.

The two-dimensional position code can advantageously code a plurality of positions within each code area. All these positions then identify one and the same information alternative and it is thus sufficient that a recording device reads the position code somewhere in the code area to record the associated information alternative.

The position code can advantageously overlap at least one, and preferably each, information alternative. This means that no specific space for the position code is required. It also renders the product more esthetically pleasing.

Furthermore it makes the product easier to use for inexperienced users, first because the user intuitively points to the information he is interested in and second because it is sufficient to point to a single spot on the desired information alternative. However, it may be sufficient to point to a spot adjacent to a desired information alternative, if the code area extends outside the actual information alternative. Thus, any hesitance about which code to be read in order to record an information alternative is eliminated.

As mentioned above, the position code advantageously extends across the entire surface of the product. Consequently, information is recorded from the entire surface and information alternatives are added later in areas in which there was no information from the outset.

In a preferred embodiment, the position code is based on a first string of symbols which contains a first predetermined number of symbols and which has the characteristic that if a second predetermined number of symbols is taken from the first string of symbols, the location of these symbols in the first string of symbols is unambiguously determined.

This first string of symbols can be used to determine the position in a first dimension on the surface. The string of symbols is advantageous since it has a so-called window characteristic. A window and, thus, a position are defined by said second predetermined number of symbols, but it is sufficient to move to the next symbol for a new position to be defined. Thus, it is possible to provide a high resolution and a code where it is only necessary to enter exactly the number of symbols that defines a position.

Furthermore, the position code can advantageously be based on a second string of symbols having the same characteristic as the first string of symbols, the second string of symbols being used to determine the position in a second dimension on the surface.

By the position code being based on strings of symbols with a finite number of symbols arranged in a predetermined order, it is possible to define a "formula" for determining the position. In this way, only a small amount of memory space is required for storing the strings of symbols and the position determination can be carried out quickly and easily.

The position code advantageously has the characteristic that each arbitrary partial surface which has a predetermined magnitude on the surface and contains the position code defines a position.

Such a position code can be implemented, for example, by means of the above-mentioned strings of symbols and is advantageous to use in this connection since it is sufficient to read the position code in an arbitrary position in the code area. The user need not strive to enter a specific area, which is the case when recording bar codes.

The position code is advantageously composed of symbols which represent at least two different values, each symbol comprising a raster point which is included in a raster extending across the surface, and at least one marking, the value of each symbol being indicated by the location of said marking in relation to a raster point.

This design of the position code is advantageous by being easy to detect and decode by image processing since only one type of symbol, i.e. one marking, need be located. This means that each marking can be made small, which in turn means that the position code need not blacken the surface very much and that the position code thus can be discreet and not disturbing to the human eye.

The position code can advantageously constitute a subset of a second position code which defines coordinates for points on a larger imaginary surface. The coordinates thus need not have an origin of coordinates on the product. This gives the advantage that the coordinate area which is coded by the position code on the product can be dedicated to a specific application, for example for inputting information alternatives that are superimposed on the position code, or to a specific type of product. An external unit to which recorded positions are transferred for identification of associated information alternatives can then distinguish positions from different products or applications.

The position code can be implemented in various ways on the surface, e.g. with the aid of a magnetic or chemical material. However, preferably it is implemented in such a way that it is optically readable. It can be optically readable in light which is outside the visible range.

In a preferred embodiment, the product is in the shape of a sheet. The sheet can, for example, be made of paper or some other material to which codes can be applied. In that way, the product will be very inexpensive and can be of the disposable kind. In the example of the restaurant, the menu and the placemat can, for example, be combined into one sheet which is replaced for each new customer.

The information alternatives can be indicated by means of written characters or graphic symbols or in some other way which makes it possible for the user to understand which information alternative is intended.

In one embodiment, the surface is provided with at least one writing area, said position code overlapping the writing area and coding coordinates for a plurality of positions in the writing area. As mentioned above, the writing area can be used to make handwritten notes which are recorded digitally by means of the position code.

The writing area need not be associated with an information alternative but can be a specific coordinate area which is dedicated to handwritten notes.

In one embodiment, however, the writing area is associated with an information alternative and constitutes part of the code area of the information alternative. A user can then tick off, for example, a relevant alternative or write a note, such as a digit, which is associated with the information alternative. If only the information alternative is to be recorded, this can be made later by reading the position code in the relevant code area. If the actual note is also to be recorded, the position code must be read while making the note.

The product can be particularly used in connection with orders and then the information alternatives constitute order alternatives. The term order relates to purchase or reservation of a product, such as a dish, a holiday trip, or reservation of a seat in a theater.

As mentioned above, several positions within a code area can define one and the same information alternative. In other words, these positions jointly define a partial surface or a field on the surface. If the code area overlaps the information alternative, the position code in the code area will thus define the field on the surface in which the information alternative with which the position code is associated is stated.

The invention can also be described as a system for recording of information. The system comprises on the one hand a product as described above; and on the other hand a device for recording one of the information alternatives, the device comprising a sensor for reading the position code in the code area associated with the information alternative and processor with software for interpreting the read position code for identifying the position which corresponds to the read position code.

This system has essentially the same advantages as stated above for the product. The device can, as its output signal, give position coordinates. The position coordinates are preferably transferred to an external unit with software which on the basis of the position coordinates determines the corresponding information alternative. Alternatively, the device itself can contain software for determining which information alternative corresponds to the position coordinates. The system may contain a table or some other memory structure which can store an information alternative for each code area on the surface. The memory structure can be available in the recording device or in the external unit. As described above, the device can be provided with a pen point. In this case, the system is suitably provided with software for interpreting notes that are made with the pen point and recorded by means of the position code.

According to a third aspect, the invention relates to a method of making a product for recording of information, comprising the steps of creating a surface with a two-dimensional position code, which codes coordinates for a plurality of positions on the surface, applying a plurality of information alternatives which are unrelated to the position code on the surface, determining, for each information alternative, a code area in which reading of the position code is to result in recording of this information alternative, and associating this code area with the information alternative in a memory structure.

The advantages of the method are evident from the discussion above regarding the product.

The step of creating a surface with a two-dimensional position code can be carried out by the user obtaining, for example, a sheet of paper with a preprinted position code. Alternatively, the position code can be written on the sheet by means of a printer and a computer before or after applying the information alternatives.

The method can comprise additional steps that are used to make a product which besides has one or more of the additional features described above.

According to a fourth aspect, the invention relates to a storage medium for a computer, on which software is stored for carrying out the steps according to the method above.

The storage medium can be any storage medium for computer programs, such as a RAM, a diskette, disk or some other type of memory with which a computer can cooperate.

The advantages of this software are evident from that stated above.

The present invention can obviously be applied within a number of different areas where graphical user interfaces are used. Examples of such areas are travel bookings, cinema ticket reservations, and hotel reservations.

The invention can also be used for all types for recording of information, particularly in cases where the information is normally first recorded on paper and then input to a computer and in cases where touch screens are used. In this case, preprinted forms with position code and information alternatives can be generated and the information alternatives then be easily recorded by reading the position code. Handwritten notes can also be made.

BRIEF DESCRIPTION OF THE DRAWINGS

The invention will be described in more detail below with reference to the accompanying schematic drawings which, by way of example, show a presently preferred embodiment of the invention.

DESCRIPTION OF PREFERRED EMBODIMENTS

Now follows first a description of two embodiments where the invention is used for recording orders at a restaurant or the like. In this case the information alternatives thus consist of order alternatives and the product is a menu. Then follows a description of examples of two different two-dimensional position codes which can advantageously be used to code coordinates for positions on different products. Subsequently, a device which can be used to record information and a system in which the device can be included are described. Finally, the way in which a product according to the invention can be made is described and a further example of a menu is stated.

Examples of Application in a Restaurant

Figures 1, 2:
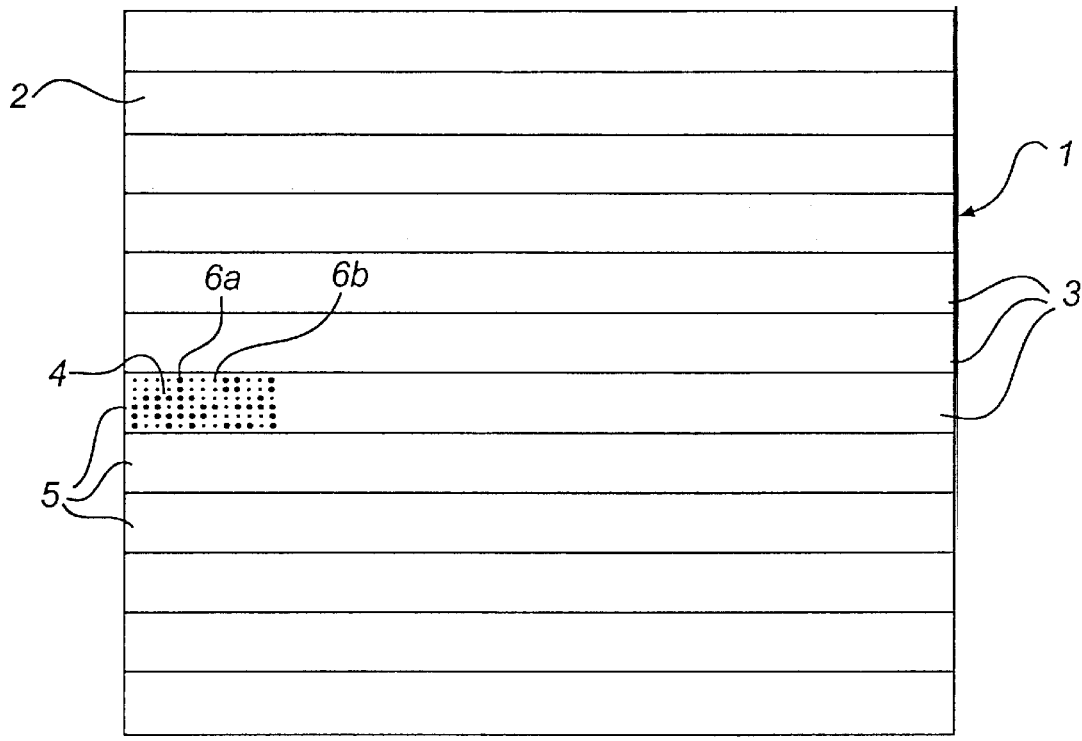
FIG. 1 shows an empty menu with code areas with a 2-dimensional code.
FIG. 2 shows the same menu as in FIG. 1, but with added order alternatives which overlap the code areas.

FIG. 1 shows a sheet 1, constituting an empty menu and having a surface 2, which is divided into twelve fields 3, to which different order alternatives can be added. All the fields 3 comprise a two-dimensional position code 4 of a type that will be described in more detail below. The position code is located in code areas 5 which in this case completely overlap the fields 3. For the sake of clarity, the position code 4 is only drawn in one part of one of the fields, but it is meant to extend across the entire surface 2. It codes the coordinates for a plurality of positions in each field 3. The fields 3 can be predefined or they can be defined by the user.

Order alternatives can be written in the fields on the sheet 1 by hand or with the aid of a computer, in which case the sheet is placed in a printer. Any order alternative can be written in the fields 5. The only thing the user must do is to connect the fields to the order alternatives, which can preferably be carried out by means of a simple computer program. In this case, the connection is effected by associating, with the aid of a table structure, all the positions which are located within a certain field and which are coded by the position code in this field with the order alternative written in this field on the menu. In some fields no order alternatives are added and these are associated with a suitable indication of the fact that there is no order alternative in that field.

FIG. 2 shows an example of a menu with order alternatives added in the form of various dishes and beverages which are written in text format. In this case, all the positions coded by the position code in the fourth field from the top are associated with the order alternative "Vegetable Soup". If the restaurant wishes, it can subsequently change the order alternative in the same field to, for example, "Avocado" without changing the coding on the sheet, by simply changing the connection from the positions coded by the position code in the field from "Vegetable Soup" to "Avocado".

In this example, the position code in FIGS. 1 and 2 is made up of symbols of a first and second type 6a, 6b and more specifically of dots of two different sizes, the dots 6a having the larger diameter representing a one and the dots 6b having the smaller diameter representing a zero. As mentioned above, for the sake of clarity the position code is only shown on a small part of the menus in FIGS. 1 and 2. Moreover, the symbols 6a, 6b have been very much enlarged and made clearly visible. In practice, the code can be completely invisible to the eye or at least a great deal more discreet in order not to spoil the appearance of the product. Furthermore, in practice the symbols can be much smaller in order to achieve a better position resolution.

The position code is arranged so that if a device images the dots on an arbitrary partial surface of a predetermined size, the position of the partial surface on the surface of the sheet can be determined automatically with the aid of image processing means in the device. If, for example, a device images the dots on the partial surface 10 in FIG. 1, a processor in the device can determine, with the aid of the position code which the dots represent, the position of the partial surface 10 on the menu.

Position Coding—Example 1

An example of a position code, hereinafter also called a position-coding pattern, which enables the position determination will be described below. The pattern is adapted for position determination by the imaging of a partial surface containing 5×5 symbols. The symbols represent a binary coding. It is assumed below that the position-coding pattern is available on a sheet of paper.

The sheet has an x-direction and a y-direction. In order to code the position in the x-direction, a 32-bit number series of ones and zeros is generated in a first step. In a second step, a 31-bit number series of ones and zeros is generated by removing the final bit of the 32-bit series. Both number series, hereinafter called the x-number series, should have the characteristic that if five successive bits are selected anywhere in the series a unique group of five bits is obtained which does not exist anywhere else in the series. They should also have this characteristic if one "connects" the end of the series to the beginning of the series. The five-bit group thus provides an unambiguous coding of the location in the series.

An example of a 32-bit number series having the above characteristic is "00001000110010100111010110111110". If the last zero is removed from this number series, a 31-bit number series having the same characteristic is obtained.

The first five bits in the above number series, i.e. 00001, constitute the code for position 0 in the number series, the next five bits, i.e. 00010, constitute the code for position 1, etc. The positions in the x-number series as a function of the five-bit groups are stored in a first table. Naturally, position 31 only exists in the 32-bit series. Table 1 below shows the position coding for the example described above.

TABLE 1

| Position | Five-bit Group |
|---|---|
| 0 | 00001 |
| 1 | 00010 |
| 2 | 00100 |
| 3 | 01000 |
| 4 | 10001 |
| 5 | 00011 |
| 6 | 00110 |
| 7 | 01100 |
| 8 | 11001 |
| 9 | 10010 |
| 10 | 00101 |
| 11 | 01010 |
| 12 | 10100 |
| 13 | 01001 |
| 14 | 10011 |
| 15 | 00111 |
| 16 | 01110 |
| 17 | 11101 |
| 18 | 11010 |
| 19 | 10101 |
| 20 | 01011 |
| 21 | 10110 |
| 22 | 01101 |
| 23 | 11011 |
| 24 | 10111 |
| 25 | 01111 |
| 26 | 11111 |
| 27 | 11110 |
| 28 | 11100 |
| 29 | 11000 |
| 30 | 10000 |
| 31 | 00000 |

It is only possible to code 32 positions, i.e. positions 0–31, with the aid of the 32-bit series. However, if one writes the 31-bit series 32 times in succession on a first row and the 32-bit series 31 times in succession on a second row below the first row, the series will be displaced in relation to each other in such a way that two five-bit groups written one above the other can be used to code 31×32=992 positions in the direction of the rows.

For example, suppose that the following code is written on the sheet:

000 . . . 11111000001000110010100111010110111110 . .

000 . . . 11111000010001100101001110101101111100 . .

If the five-bit groups are translated into positions according to Table 1, the following positions of the 32- and 31-bit series are indicated on the sheet.

0 1 2 . . . 30 31 0 1 2 . . . 29 30 31 0 1 2
0 1 2 . . . 30 0 1 2 3 . . . 30 0 1 2 3 4

The coding in the X-direction is thus based on using a number series consisting of n bits which is made up in such a way that if m successive numbers are taken from the series, these m numbers will code the position in the series unambiguously. The number of codable positions is increased by using a second number series, which is a subset of the first number series and which is thus of a different length than the first series. In this way, a displacement between the series is obtained in the longitudinal direction of the rows.

The coding in the Y-direction is based on the same principle. A number series is created, hereinafter called the Y-number series, which consists of p numbers, the series being made up in such a way that if r successive numbers are taken from the series, these r numbers will code the position in the series and thus the position in the Y-direction unambiguously. The numbers in the Y-number series are coded in the pattern on the sheet as a difference between the positions in the X-direction in two rows which is calculated in a special way.

More specifically, alternate rows of the 31-bit series and the 32-bit series are written as follows:

Row 1: (31) (31) (31) (31) . . .
Row 2: (32) (32) (32) (32) . . .
Row 3: (31) (31) (31) (31) . . .
Row 4: (32) (32) (32) (32) . . .
Row 5: (31) (31) (31) (31) . . .

Naturally, on the sheet, the series are written using the different sizes of dots. The rows start in different positions in the X-number series. More specifically, one begins two successive rows in such a way that if one determines the difference modulo 32 between two position numbers located one above the other, expresses the difference by means of a five-bit binary number, and takes the two most significant bits of said five-bit binary number, this number shall be the same regardless of where one is in the row. In other words, one starts the series in such a way that the displacements between the series in two successive rows remain within a specific interval along the entire row. In this example, the maximum displacement can be 31 positions or bits and the minimum displacement can be 0 positions or 0 bits. The displacements along each pair of rows is then within one of the intervals 0–7, 8–15, 16–23, or 24–31 positions/bits.

For example, suppose that the series are written as follows (expressed in position numbers):

Row 1: 0 1 2 3 4 5 6 7 . . . 30 0 1 2 3
Row 2: 0 1 2 3 4 5 6 7 . . . 30 31 0 1 2
Row 3: 25 26 27 28 29 30 0 1 . . . 24 25 26 27 28
Row 4: 17 18 19 20 21 22 23 24 . . . 16 17 18 19 20
Row 5: 24 25 26 27 28 29 30 0 . . . 23 24 25 26 27

If the difference is determined in the above way, it will be 0 between rows 1 and 2, 0 between rows 2 and 3, 1 between rows 3 and 4, and 3 between rows 4 and 5. Take, for example, 26–18 in rows 3 and 4, which equals 8, which is 01000 in binary code. The two most significant numbers are 01. If instead one takes 0–23 in the same rows, which modulo 32 equals 9, the two most significant numbers are 01 just like in the previous example. In this example, four difference numbers 0,0,1,3 are obtained. Now, if in same way as for the X-direction, one has created a Y-number series from the numbers 0, 1, 2, and 3 which has the characteristic that if four successive numbers are taken from the series, the position in the series will be determined unambiguously, it is possible by looking up the number 0013 in a table to unambiguously determine the position in the Y-direction. In this way, it is possible to determine 256 unique positions in the Y-direction.

The following is an example of the beginning and the end of a Y-number series containing the numbers 0–3:

TABLE 2

| | |
|---|---|
| 0 | 0000 |
| 1 | 0001 |
| 2 | 0010 |
| 3 | 0100 |
| 4 | 1000 |
| 5 | 0002 |
| 6 | 0020 |
| 7 | 0200 |
| 8 | 2000 |
| 9 | 0003 |
| 10 | 0030 |

TABLE 2-continued

| | |
|---|---|
| . | . |
| . | . |
| . | . |
| 251 | 2333 |
| 252 | 3333 |
| 253 | 3330 |
| 254 | 3300 |
| 255 | 3000 |

The following is a description of how the position determination is carried out. Suppose that one has a sheet as described above which across its surface has a pattern made up of a first symbol representing a one and a second symbol representing a 0. The symbols are arranged in rows and columns and in 32-bit and 31-bit series as described above. Furthermore, suppose that one wishes to determine the position on the sheet where one places a device equipped with a sensor which can record an image containing 5×5 symbols.

Suppose that an image recorded by the sensor looks as follows:

1 1 1 1 1
1 1 1 1 1
0 1 0 1 0
0 0 1 0 1
0 0 1 0 1

In a first step, the device translates these five-bit groups into positions with the aid of Table 1. The following positions are obtained:

26 (11010)
26 (11010)
11 (01011)
10 (01010)
10 (01010)

Subsequently, the magnitude of the displacement between the position numbers in the different rows is determined by taking the difference modulo 32. The two most significant numbers of the differences determined in this manner expressed as five-bit binary numbers are 0, 1, 0, 0. According to Table 2, this difference number equals position 3 in the Y-direction. Thus, the coordinate for the second dimension on the sheet is 3.

A third table stores the starting position of each row, i.e. the position in the numbers series where each row starts. In this case, with the aid of the y-coordinate 3 it is possible to look up the starting positions of the rows from which the recorded five-bit groups have been taken. Knowing the starting positions of the rows from which the two uppermost five-bit groups have been taken and the X-positions to which these two five-bit groups correspond, i.e. positions 26 and 26, it is possible to determine the x-coordinate, or the position in the first dimension, of the recorded image. For example, suppose that the starting positions of the two uppermost rows are 21 and 20 respectively. In this case, the two rows from which the two uppermost five-bit groups in the recorded image are taken will thus look as follows:

Row 3: 21 22 23 . . . 29 30 31 0 1 2 . . . 25 26 27 . . .
Row 4: 20 21 22 . . . 28 29 30 0 1 2 . . . 25 26 27 . . .

It follows from the fact that the y-coordinate is 3 that the two first five-bit groups are taken from rows 3 and 4. It follows from the fact that odd rows are made up of the 31-bit number series and even rows are made up of the 32-bit number series that row 3 is made up of a 32-bit number series while row 4 is made up of a 31-bit number series.

On the basis of this information, it is possible to determine that the x-coordinate is 35. This can be verified by repeating the above steps for the remaining pairs of five-bit groups in the recorded image. There is thus a certain amount of error tolerance.

The accuracy of the position determination can be further increased by determining the location of the middle dot in the 5×5 group in relation to the center of the image. The position resolution can thus be better than the distance between two symbols.

Naturally, the above steps are carried out by software, which in this example gives the coordinates 3 and 35 as its output signal. The software can either be located in the device the customer or waiter is using to read the position-coding pattern on the menu or in another device to which the image(s) is(are) transferred.

The above description relates to an example and can thus be generalized. There need not be 32 numbers in the first X-number series. The number depends on how many different symbols are to be used in the pattern in combination with the number of symbols which are recorded in the x-direction in connection with the position determination. For example, if the number of different symbols is 3 and the number of recorded symbols is 3, the maximum number of numbers in the X-number series will be 3×3×3=27 instead of 32. The same type of reasoning applies to the Y-number series. The bases of these number series can thus be different and the number of symbols which code a position, and consequently also the number of positions coded by the number series, can vary. Moreover, the series can be based on symbols other than numbers and can therefore be described as strings of symbols.

As mentioned above, the symbols can be of many different kinds. They can also be numbers, but in that case OCR software is required for carrying out the position determination, which makes the device for interpreting the position-coding pattern more expensive and more complicated. It also leads to increased error sensitivity.

The above method of coding positions on a surface and of carrying out the position determination on the surface is advantageous in that it only requires a very small amount of memory and processor capacity. In the above example, it is only necessary to store Table 1 with 32 rows, Table 2 with 256 rows, and Table 3 with 256 rows. The position determination can be carried out by means of three table look-ups and a simple calculation. When the position has been determined, it is necessary to search the table one more time in order to determine the order alternative to which the position corresponds. However, this can be carried out in a central computer to which the position is transferred.

It should be emphasized that it is, of course, possible to let the rows be columns and the columns be rows in the above Example.

Position Coding—Example 2

Now follows the description of an Example of a second two-dimensional position coding which can be used to accomplish the invention.

Figure 3:
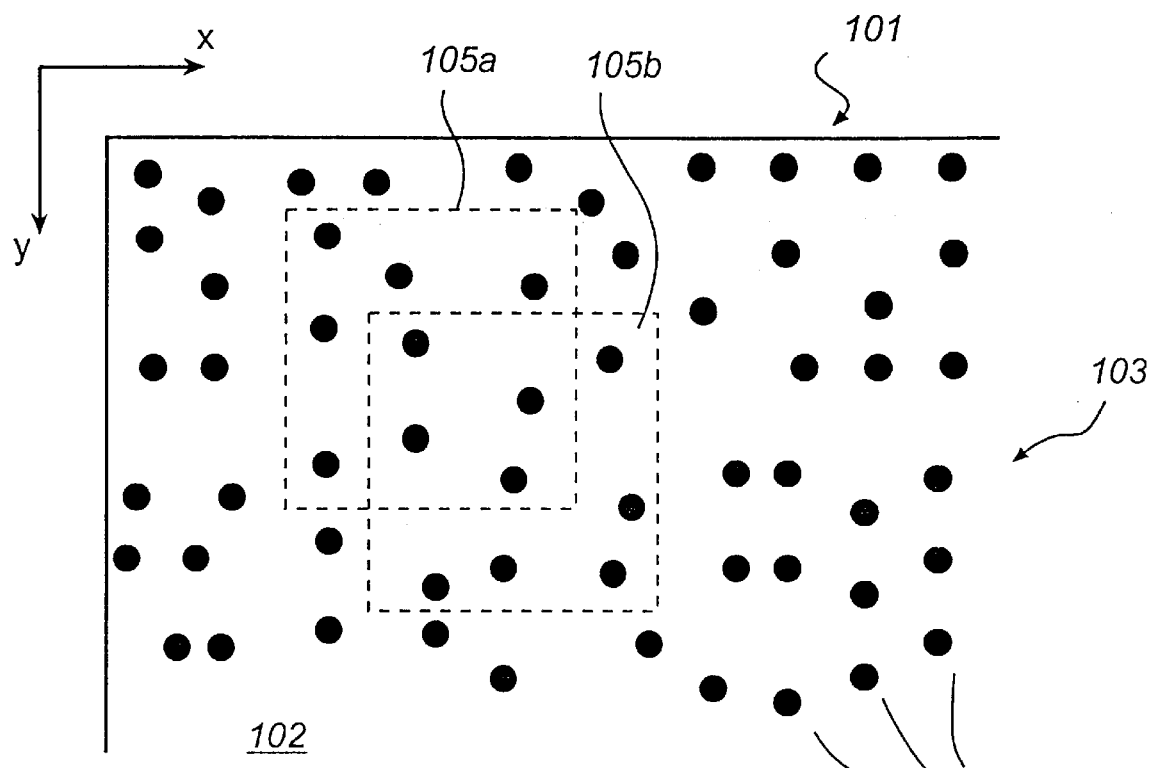
FIG. 3 shows schematically a sheet of paper which is provided with a subset of an absolute position-coding pattern.
Figure 4:
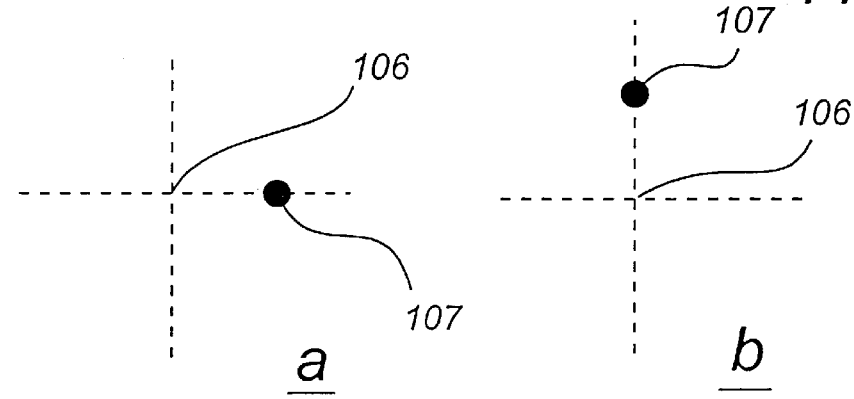
FIG. 4 shows schematically how symbols included in the absolute position-coding pattern can be composed.

FIG. 3 shows a part of a product in the form of a sheet of paper 101, which on its surface 102 is provided with an optically readable, two-dimensional position coding 103 (below referred to as position-coding pattern) enabling position determination, more specifically determination of absolute coordinates for points on the sheet 101. The position-coding pattern consists of symbols 104 which are systematically arranged across the surface 102 so as to make its appearance "patterned". Depending on the size of the symbols, the patterning can be perceived as a gray hue. The sheet has an x-coordinate axis and a y-coordinate axis.

The position-coding pattern comprises a virtual raster, which thus neither is visible to the human eye nor can be detected directly by a device which is to determine positions on the surface, and a plurality of symbols 4, which each are capable of assuming one of four values "1"–"4" as will be described below. It should here be emphasized that, for the sake of clarity, the position-coding pattern in FIG. 3 has been enlarged to a considerable extent. Moreover, the position-coding pattern is shown only on part of the sheet.

The position-coding pattern is arranged in such manner that absolute coordinates for a point on the imaginary surface are coded by the symbols on a partial surface of the sheet, and thus by the position-coding pattern, of a predetermined size. A first and a second partial surface 105a, 105b are indicated by dashed lines in FIG. 3. That part of the position-coding pattern (in this case 3×3 symbols) which is to be found on the first partial surface 105a codes the coordinates for a first point, and that part of the position-coding pattern which is to be found on the second partial surface 105b codes the coordinates for a second point on the sheet. Thus the position-coding pattern is partially shared by the adjoining first and second points. Such a position-coding pattern is in this application referred to as "floating".

FIGS. 4a–d show an embodiment of a symbol which can be used in the position-coding pattern. The symbol comprises a virtual raster point 106 which is represented by the intersection between the raster lines, and a marking 107 which has the form of a dot. The value of the symbol depends on where the marking is located. In the example in FIG. 4, there are four possible positions, one on each of the raster lines extending from the raster points. The displacement from the raster point is equal to all values. In the following, the symbol in FIG. 4a has the value 1, in FIG. 4b the value 2, in FIG. 4c the value 3 and in FIG. 4d the value 4. Expressed in other words, there are four different types of symbols.

Each symbol can thus represent four values "1–4". This means that the position-coding pattern can be divided into a first position code for the x-coordinate, and a second position code for the y-coordinate. The division is effected as follows:

| Symbol value | x-code | y-code |
|---|---|---|
| 1 | 1 | 1 |
| 2 | 0 | 1 |
| 3 | 1 | 0 |
| 4 | 0 | 0 |

Thus, the value of each symbol is translated into a first digit, in this case bit, for the x-code and a second digit, in this case bit, for the y-code. In this manner, two completely independent bit patterns are obtained. The patterns can be combined to a common pattern, which is coded graphically by means of a plurality of symbols according to FIG. 4.

The coordinates for each point are coded by means of a plurality of symbols. In this example, use is made of 4×4 symbols to code a position in two dimensions, i.e. an x-coordinate and a y-coordinate.

The position code is made up by means of a number series of ones and zeros which have the characteristic that no sequence of four bits appears more than once in the series. The number series is cyclic, which means that the characteristic also applies when one connects the end of the series to the beginning of the series. Thus a four-bit sequence always has an unambiguously determined position in the number series.

The series can maximally be 16 bits long if it is to have the above-described characteristic for sequences of four bits. In this example, use is, however, made of a series having a length of seven bits only as follows:

"0 0 0 1 0 1 0".

This series contains seven unique sequences of four bits which code a position in the series as follows:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series is written sequentially in columns across the entire surface that is to be coded. The coding is based on the difference or position displacement between numbers in adjoining columns. The size of the difference is determined by the position (i.e. with which sequence) in the number series, in which one lets the column begin. More specifically, if one takes the difference modulo seven between on the one hand a number which is coded by a four-bit sequence in a first column and which thus can have the value (position) 0–6, and, on the other hand, a corresponding number (i.e. the sequence on the same "level") in an adjoining column, the result will be the same independently of where along the two columns one makes the comparison. By means of the difference between two columns, it is thus possible to code an x-coordinate which is constant for all y-coordinates.

Since each position on the surface is coded with 4×4 symbols in this example, three differences (having the value 0–6) as stated above are available to code the x-coordinate. Then the coding is carried out in such manner that of the three differences, one will always have the value 1 or 2 and the other two will have values in the range 3–6. Consequently no differences are allowed to be zero in the x-code. In other words, the x-code is structured so that the differences will be as follows:

(3–6) (3–6) (1–2) (3–6) (3–6) (1–2) (3–6) (3–6) (1–2) . . .

Each x-coordinate thus is coded with two numbers between 3 and 6 and a subsequent number which is 1 or 2. If three is subtracted from the high numbers and one from the low, a number in mixed base will be obtained, which directly yields a position in the x-direction, from which the x-coordinate can then be determined directly, as shown in the example below.

By means of the above described principle, it is thus possible to code x-coordinates 0, 1, 2 . . . , with the aid of numbers representing three differences. These differences are coded with a bit pattern which is based on the number series above. The bit pattern can finally be coded graphically by means of the symbols in FIG. 6.

In many cases, when reading 4×4 symbols, it will not be possible to produce a complete number which codes the x-coordinate, but parts of two numbers. Since the least significant part of the numbers is always 1 or 2, a complete number, however, can easily be reconstructed.

The y-coordinates are coded according to the same principle as used for the x-coordinates. The cyclic number series is repeatedly written in horizontal rows across the surface which is to be position-coded. Just like in the case of the x-coordinates, the rows are allowed to begin in different positions, i.e. with different sequences, in the number series. However, for y-coordinates one does not use differences but codes the coordinates with numbers that are based on the starting position of the number series on each row. When the x-coordinate for 4×4 symbols has been determined, it is in fact possible to determine the starting positions in number series for the rows that are included in the y-code in the 4×4 symbols. In the y-code the most significant digit is determined by letting this be the only one that has a value in a specific range. In this example, one lets one row of four begin in the position 0–1 in the number series to indicate that this row relates to the least significant digit in a y-coordinate, and the other three begin in the position 2–6. In y-direction, there is thus a series of numbers as follows: (2–6) (2–6) (2–6) (0–1) (2–6) (2–6) (2–6) (0–1) (2–6) . . . Each y-coordinate thus is coded with three numbers between 2 and 6 and a subsequent number between 0 and 1.

If 1 is subtracted from the low number and 2 from the high, one obtains in the same manner as for the x-direction a position in the y-direction in mixed base from which it is possible to directly determine the y-coordinate.

With the above method it is possible to code 4×4×2=32 positions in x-direction. Each such position corresponds to three differences, which gives 3×32=96 positions. Moreover, it is possible to code 5×5×5×2=250 positions in y-direction. Each such position corresponds to 4 rows, which gives 4×250=1000 positions. Altogether it is thus possible to code 96000 positions. Since the x-coding is based on differences, it is, however, possible to select in which position the first number series begins. If one takes into consideration that this first number series can begin in seven different positions, it is possible to code 7×96000=672000 positions. The starting position of the first number series in the first column can be calculated when the x-coordinate has been determined. The above-mentioned seven different starting positions for the first series may code different sheets of paper or writing surfaces on a product.

With a view to further illustrating how the position-coding pattern functions, here follows a specific example which is based on the described embodiment of the position code.

Figure 5:
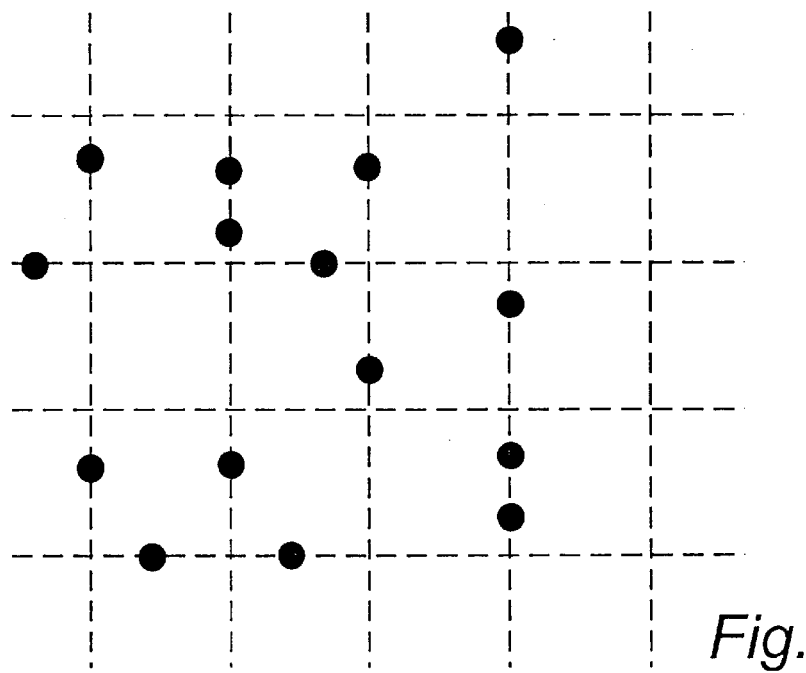
FIG. 5 shows schematically an example of 4×4 symbols that are used to code a position.

FIG. 5 shows an example of an image with 4×4 symbols which are read by a device for position determination.

These 4×4 symbols have the following values:

4 4 4 2
3 2 3 4
4 4 2 4
1 3 2 4

These values represent the following binary x- and y-code:

| x-code: | y-code: |
|---------|---------|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x-sequences code the following positions in the number series: 2 0 4 6. The differences between the columns will be −2 4 2, which modulo 7 gives: 5 4 2, which in mixed base codes position (5−3)×8+(4−3)×2+(2−1)=16+2+1=19. Since the first coded x-position is position 0, the difference which is in the range 1–2 and which is to be seen in the 4×4 symbols is the twentieth such difference. Since furthermore there are a total of three columns for each such difference and there is a starting column, the vertical sequence furthest to the right in the 4×4 x-code belongs to the 61st column in the x-code (3×20+1=61) and the one furthest to the left belongs to the 58th.

The horizontal y-sequences code the positions 0 4 1 3 in the number series. Since these series begin in the 58th column, the starting position of the rows are these numbers minus 57 modulo7, which yields the starting positions 6 3 0 2. Translated into digits in the mixed base, this will be 6–2, 3–2, 0–0, 2–2=4 1 0 0 where the third digit is the least significant digit in the number at issue. The fourth digit is then the most significant digit in the next number. In this case, it must be the same as in the number at issue. (An exceptional case is when the number at issue consists of the highest possible digits in all positions. Then one knows that the beginning of the next number is one greater than the beginning of the number at issue.)

The position of the four-digit number will then in the mixed base be 0x50+4x10+1x2+0x1=42.

The third row in the y-code thus is the 43rd which has the starting position 0 or 1, and since there are four rows in all on each such row, the third row is number 43×4=172.

Thus, in this example, the position of the uppermost left corner for the 4×4 symbol group is (58,170).

Since the x-sequences in the 4×4 group begin on row 170, the x-columns of the entire pattern begin in the positions of the number series ((2 0 4 6)−169) modulo 7=1 6 3 5. Between the last starting position (5) and the first starting position, the numbers 0–19 are coded in the mixed base, and by adding up the representations of the numbers 0–19 in the mixed base, one obtains the total difference between these columns. A naive algorithm to do so is to generate these twenty numbers and directly add up their digits. The resulting sum is called s. The sheet of paper or writing surface will then be given by (5−s)modulo7.

In the example above, an embodiment has been described, in which each position is coded with 4×4 symbols and a number series with 7 bits is used. Of course, this is but an example. Positions can be coded with a larger or smaller number of symbols. The number of symbols need not be the same in both directions. The number series can be of different length and need not be binary, but may be based on another base. Different number series can be used for coding in x-direction and coding in y-direction. The symbols can have different numbers of values. A coding with 6×6 symbols is presently preferred, in which case each symbol can assume four values. A person skilled in the art can easily generalize the Examples above to relate to such coding.

In the example above, rows can of course be replaced with columns and columns be replaced with rows.

In the example above, the marking is a dot but may, of course, have a different appearance. For example, it may consist of a dash or some other indication which begins in the virtual raster point and extends therefrom to a predetermined position.

In the example above, the symbols within a square partial surface are used for coding a position. The partial surface may have a different form, such as hexagonal. The symbols need not be arranged in rows and columns at an angle of 90° to each other but can also be arranged in some other manner.

For the position code to be detected, the virtual raster must be determined. This can be carried out by studying the distance between different markings. The shortest distance between two markings must derive from two neighboring symbols having the value 1 and 3 so that the markings are located on the same raster line between two raster points. When such a pair of markings has been detected, the associated raster points can be determined with knowledge of the distance between the raster points and the displacement of the markings from the raster points. When two raster points have once been located, additional raster points can be determined by means of measured distances to other markings and with knowledge of the relative distance of the raster points.

In an actual design of the position code, a nominal space of 0.3 mm between the symbols has been used. If each position is coded with 6×6 symbols, then a 1.8 mm×1.8 mm surface is required for one position. By determining the position of the 6×6 symbols on a sensor in a recording device which is used to read the position code, a position can be calculated with a resolution of 0.03 mm. Since each position is coded with 6×6 symbols which can each assume one of four values, $2^{72}$ positions can be coded, which with the above-mentioned nominal space between the symbols corresponds to a surface of 4.6 million $km^2$. This fact that a very large number of unique positions can be coded, can as mentioned above be utilized by dedicating different coordinate areas to specific applications.

The position code can be printed by standard offset printing on any sheet of paper or other material. A common black carbon-based printing ink or some other printing ink that absorbs IR light can advantageously be used. This means that other inks, including black ink which is not carbon-based, can be used to superimpose some other print on the position code without interfering with the reading thereof.

A surface which is provided with the above-mentioned position code printed with a carbon-based black printing ink will be experienced by the human eye as merely a slight gray hue of the surface (1–3% black), which is user-friendly and esthetically pleasing.

It goes without saying that a larger or smaller number of symbols than described above can be used to define a position on the imaginary surface, and larger or smaller distances between the dots can be used in the pattern. The examples are stated just to show a presently preferred implementation of the pattern.

It is evident that the above described position-coding pattern codes absolute positions.

Device for Recording Information

Figure 6:
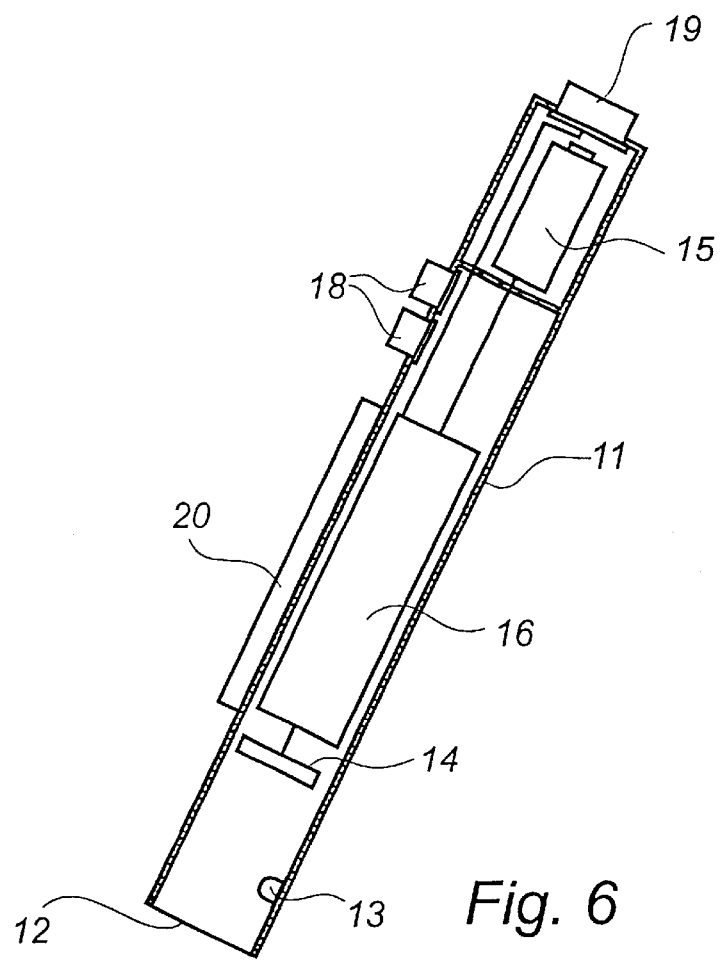
FIG. 6 shows a device for recording an order alternative from the menu in FIG. 2.

An embodiment of a device for recording orders is schematically shown in FIG. 6. The device is adapted to record information alternatives by means of a 2-dimensional position code of the type described above.

The device comprises a casing 11 having approximately the shape of a pen. In the short side of the casing there is an opening 12. The short side is intended to abut against or be placed a short distance from the product from whose surface an information alternative is to be recorded by reading the position code.

The casing contains essentially an optics part, an electronic circuitry part, and a power supply.

The optics part comprises at least one light emitting diode 13 for illuminating the surface which is to be imaged and a light-sensitive area sensor 14, such as a CCD or CMOS sensor, for recording a two-dimensional image. The device may also comprise a lens system.

The power supply to the device is obtained from a battery 15 which is mounted in a separate compartment in the casing. The electronic circuitry part comprises processing means 16 for determining a position on the basis of the recorded image and more specifically a processor which is programmed to read images from the sensor and to carry out position determination on the basis of a position code which is identified in these images.

Moreover, the device comprises buttons 18 by means of which the user activates and controls the device. It also comprises a transceiver 19 for wireless transfer of information to and from the device. The device can also comprise a display 20 for showing recorded orders.

Applicant's Swedish Patent No. 9604008-4 describes a device for recording text. This device can be used to record orders if programmed in a suitable way.

The device can be divided into different physical casings, a first casing containing the area sensor and other components required for capturing images of the code and for transferring them to a processor which is located in a second casing and which carries out the position determination on the basis of the recorded image or images.

System for Recording Information

Figure 7:
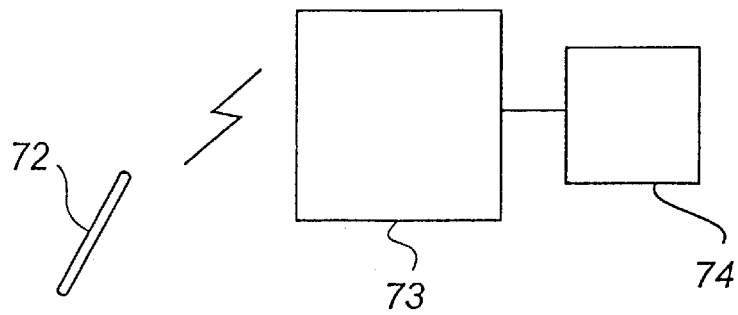
FIG. 7 shows schematically a system according to an embodiment of the invention.

FIG. 7 shows schematically an embodiment of a system according to the invention. The system comprises a product 71 with position code and information alternatives, a device 72 for reading the position code for recording of information alternatives, and an external computer 73 with a memory structure 74 for storing which positions correspond to which information alternatives.

The product 71 can be, for example, the menu shown in FIG. 2, and the device 72 can be, for example, the device shown in FIG. 6. The computer 73 can be an ordinary personal computer which can also be used for other purposes and which contains suitable software. The memory structure can be a table, a database or the like which is stored in the memory of the computer or in a memory which is connected to the computer. The computer 73 can also be a computer which is reached via computer network, such as the Internet, and which communicates with a plurality of devices 72 for recording information. In this case, read positions can be transferred from the device 72 via a network connecting unit (not shown), such as a mobile phone, which allows transfer of information to the computer network.

As is evident from that stated above, the two-dimensional position code can code coordinates for a very large number of unique positions—a much larger number than required on, for example, a normal size sheet. This can be used to distinguish individual products or applications for which products are used. More specifically, different coordinate areas within the area that can be coded with the position code can be dedicated to different products or different applications. In the case where the computer 73 communicates with a plurality of devices 72, e.g. the computer 73 can identify to which product the received positions relate and, thus, correctly identify associated information alternatives which, for example, can be transferred to another computer in the computer network where the recorded information is to be used.

Software for Makinq the Product

Figure 8:
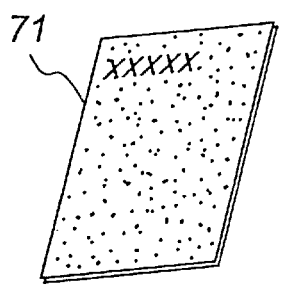
FIG. 8 shows schematically a flow chart for software for making the product.
Figure 8:
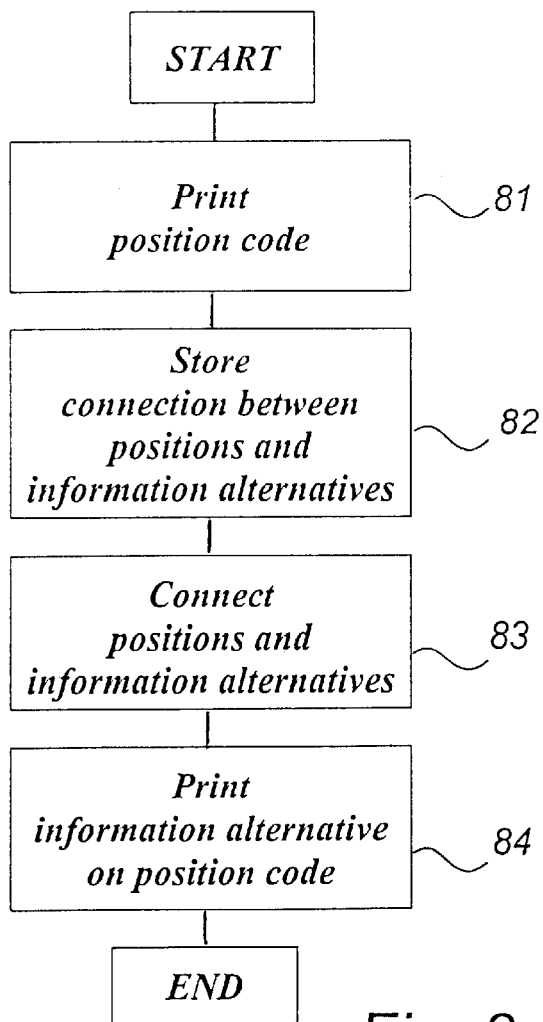

FIG. 8 shows schematically a flow chart for software which is used in a computer, such as the computer 73 in FIG. 7, for making a product according to the invention, in this case exemplified by the menu shown in FIG. 2.

In a first step 81, the software prints the position code on a sheet of paper which is to be the menu in FIG. 2 via a printer. The position code covers the entire sheet. The position code codes coordinates within a coordinate area. The specific coordinate area can be preset in the program or be selected within certain limits.

In a second step 82, the user enters the various information alternatives via the keyboard of the computer. The software can be designed to suggest different code areas in which the user can indicate information alternatives. In a variant, the user can himself define code areas, for example by "drawing" areas on the sheet of paper by means of a device for recording information, such as the device 72 in FIG. 7, which then records the coordinates for the points defining the code areas. In a further variant, the user can draw boxes on a copy of the sheet of paper which is shown on the display of the computer.

In connection with this step, the connection between positions on the sheet of paper and information alternatives is stored in a memory structure, step 83.

Then the user places the sheet in the printer and the information alternatives entered via the keyboard are printed on the sheet, step 84, whereupon the product is ready to be used for recording information.

The first step 81 need not be carried out by the software. The user can instead buy sheets which are already provided with position code.

Function of the System

Here follows the description of the function of the system with reference to the Example in FIG. 2.

A customer at the restaurant can record her order herself with the aid of the above device. First, the customer decides which dish she is interested in. Next, she points to this dish on the menu using the device for recording the order, so that the opening of the device is above or a short distance from the order alternative. The sensor 14 in the device then reads the position code 4 within the visual field of the device and the processor means 16 determine the position on the menu 1. Subsequently, the position is stored in a memory in the device, or is transferred directly to an order computer together with data indicating which customer the position information originates from. The transfer to the order computer is effected by the intermediary of the transceiver 19, for example utilizing radio waves according to the so-called "Bluetooth system". When the order computer has received the position information it looks up the order alternative, i.e. the dish, to which this position corresponds in the memory structure in the computer and sends the order to the kitchen where the dish is prepared.

Naturally, the waiter can record the order instead with the aid of the device.

In an alternative embodiment, there can be a box in front of each order alternative on the menu. The customer ticks the boxes in front of the dishes and beverages she wishes to order, whereupon the waiter records the order by pointing the device to each tick so that an image of the position code for each tick is recorded.

In one more alternative embodiment, the customer, or the waiter, can by means of the device which then is provided with a pen, note the number of ordered dishes by noting a digit or the corresponding number of dashes in connection with the ordered dish. If, for example, the customer orders two smoked salmon toasts, a two is written in front of the smoked salmon toast alternative. The two is recorded digitally by means of the device and is transferred to the kitchen. The customer keeps the menu with the notes about the order as a receipt of the order as made.

Figure 9:
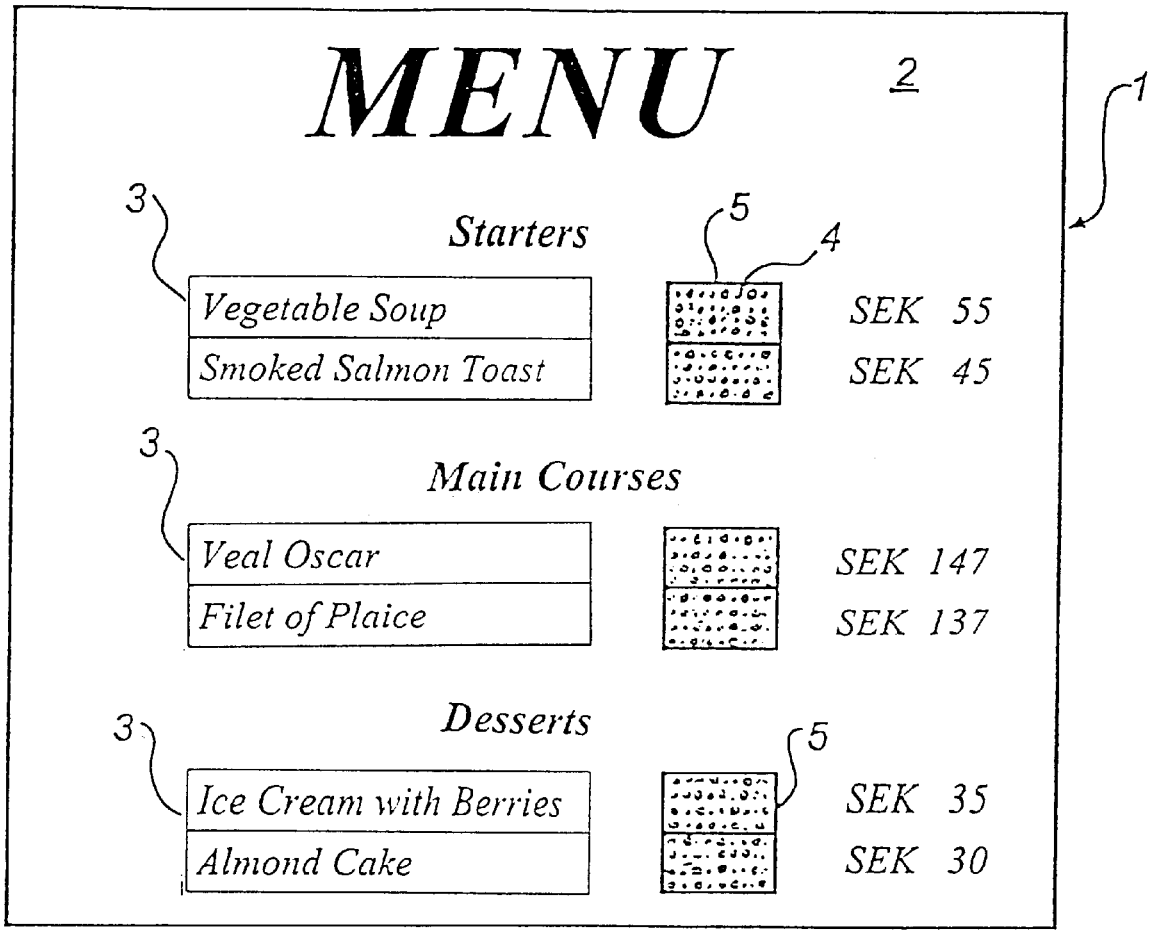
FIG. 9 shows a menu with order alternatives and associated code areas which do not overlap the order alternatives.

In the above example, the code areas overlap the order alternatives so that the user can point directly to the order alternative. Alternatively, the code areas 5, as shown in FIG. 9, can be separated from the fields 3, i.e. the order alternatives, and instead be arranged adjacent to them. In this embodiment, one avoids the problem of the superimposed order alternative interfering with the reading of the code but, on the other hand, a special area is required for the code areas, which may be a drawback in certain applications.

The above example relates to orders taken at a restaurant. Naturally, the same technology can be used for ordering seats at a cinema, a theater or on an airplane and for all other types of orders where alternatives can be presented using text or graphical information.

Moreover, it should be noted that for the sake of clarity, the code areas 5 are indicated on the menus in the Figures. This is not necessary in practice.

In the above example, the invention has been used for recording orders at a restaurant. However the invention can be used to record any type of information.

For example, the above menu could instead be a form used for documenting the results of a vehicle inspection. In that case, the user can record information about defects in the vehicle by reading the code for different alternatives on the inspection report. For example, suppose that a safety belt in the vehicle is so defective that in the inspection the car is given a negative rating of three out of three possible levels. "Safety belt" is written on the form and there are three boxes for the three different levels. In this case, the inspector uses the device to read the position code in the third box. The device determines which position the position code represents. This position thus identifies a field on the surface of the form, viz. the field corresponding to the third box after the words "safety belt". The field is identified by means of the position. The information alternative associated with the field, viz. "safety belt rating level 3", is stored in the device, or in a unit to which the position information is transferred. By reading the position code, it is thus possible to record this information.

The invention can be used in a similar way to record other types of information.

What is claimed is:

1. A product intended to be used in connection with the recording of information and having a surface on which there are a plurality of different information alternatives, each having an associated code area, wherein the surface is provided with a two-dimensional position code which codes coordinates for a plurality of positions on the surface in said code areas and is unrelated to the information to be recorded, said surface permitting recording of a desired information alternative by reading the position code for a position in the code area associated with the desired information alternative.

2. A product according to claim 1, wherein said position code codes the coordinates for a plurality of positions in at least one code area, so that the associated information alternative can be recorded by reading an arbitrary position in said at least one code area.

3. A product according to claim 1 or 2, wherein the position code overlaps at least one of the information alternatives.

4. A product according to claim 1, wherein the position code extends across the entire surface.

5. A product according to claim 1, wherein the position code is based on a first string of symbols containing a first predetermined number of symbols and having the characteristic that if a second predetermined number of symbols is removed from the first string of symbols, the location of the symbols in the first string of symbols is unambiguously determined.

6. A product according to claim 5, wherein the position code is further based on a second string of symbols having the same characteristic as the first string of symbols.

7. A product according to claim 1, wherein the position code has the characteristic that each arbitrary partial surface having a predetermined size on the surface and containing the position code defines a position.

8. A product according to claim 1, wherein the position code is made up of symbols representing at least two different values, wherein each symbol comprises a raster point which is included in a raster extending across the surface, and at least one marking; and wherein the value of each symbol is indicated by the position of said marking in relation to a raster point.

9. A product according to claim 1, wherein the position code is a subset of a greater position code.

10. A product according to claim 1, wherein the position code is optically readable.

11. A product according to claim 1, wherein the product has the form of a sheet.

12. A product according to claim 1, wherein the information alternatives are stated using written characters.

13. A product according to claim 1, wherein said surface is provided with at least one writing area and wherein said position code overlaps the writing area and codes coordinates for a plurality of positions in the writing area.

14. A product according to claim 13, wherein said writing area is associated with an information alternative and constitutes part of the code area of the information alternative.

15. A product according to claim 1, wherein the position code in each code area identifies a field on the surface, in which the information unit with which the position code is associated is reproduced.

16. A system for recording information, said system comprising:

a product according to claim 1; and a device for recording one of said plurality of information alternatives, said device including:

a sensor for reading the position code in the code area associated with said information alternative, and processor means executing software for interpreting the read code in order to identify the position which corresponds to the read position code.

17. A system according to claim 16, wherein said device further executes software for identifying the recorded information unit on the basis of the identified position.

18. A system according to claim 16 or 17, further comprising a memory structure for storing an information unit for each code area on the surface.

19. A method for making a product for recording information, comprising steps of:

creating a surface with a two-dimensional position code, which codes coordinates for a plurality of positions on the surface;

applying a plurality of information alternatives which are unrelated to the position code on the surface;

determining, for each information alternative, a code area in which reading of the position code is to result in recording of this information alternative; and associating this code area with the information alternative in a memory structure.

20. A storage medium for a computer, on which software for carrying out the steps according claim 19 is stored.

* * * * *